United States Patent
Ikeda et al.

(10) Patent No.: US 6,806,225 B1
(45) Date of Patent: Oct. 19, 2004

(54) CATALYST FOR EXHAUST GAS PURIFICATION, PROCESS FOR PRODUCING THE SAME, AND METHOD OF PURIFYING EXHAUST GAS

(75) Inventors: Yasuo Ikeda, Toyota (JP); Hiroshi Hirayama, Okazaki (JP); Riemi Tanizawa, Toyota (JP); Sinji Tsuji, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/701,737

(22) PCT Filed: Jun. 24, 1999

(86) PCT No.: PCT/JP99/03422
§ 371 (c)(1),
(2), (4) Date: Dec. 4, 2000

(87) PCT Pub. No.: WO00/00283
PCT Pub. Date: Jan. 6, 2000

(30) Foreign Application Priority Data

Jun. 30, 1998 (JP) ............................................ 10-184574

(51) Int. Cl.⁷ ............................ B01J 23/46; B01J 23/42; B01J 23/44; B01J 8/00; C01B 21/00
(52) U.S. Cl. ................. 502/326; 423/239.1; 423/213.5; 502/327; 502/328; 502/330
(58) Field of Search ........................... 423/213.5, 239.1; 502/326–328, 330

(56) References Cited

U.S. PATENT DOCUMENTS 4,675,308 A * 6/1987 Wan et al. .................... 502/304
5,130,109 A * 7/1992 Wan ......................... 423/213.2

FOREIGN PATENT DOCUMENTS

| EP | 370523 A1 | 5/1990 |
| EP | 455491 A2 | 11/1991 |
| EP | 0 657 204 A1 | 6/1995 |
| EP | 0 707 882 A1 | 4/1996 |
| EP | 0 786 285 A2 | 7/1997 |
| EP | 852966 A1 | 7/1998 |
| EP | 1 036 591 A1 | 9/2000 |
| JP | 62-125855 A | 6/1987 |
| JP | 62-152540 A | 7/1987 |
| JP | A-5-317652 | 12/1993 |
| JP | A-6-327945 | 11/1994 |
| JP | A-8-99034 | 4/1996 |
| JP | 10-000356 | 1/1998 |
| JP | 10-128114 A | 5/1998 |
| JP | A 11-76838 | 3/1999 |
| JP | A 11-138021 | 5/1999 |
| JP | A 11-226404 | 8/1999 |
| JP | A 11-276907 | 10/1999 |

* cited by examiner

Primary Examiner—Stanley S. Silverman
Assistant Examiner—Jonas N. Strickland
(74) Attorney, Agent, or Firm—Oliff & Berridge, PLC

(57) ABSTRACT

An $NO_x$ storage member including at least one member selected from the group consisting of alkali metals, alkaline-earth metals and rare-earth elements, and at least one noble metal selected from the group consisting of Pt, Pd and Rh are loaded on a support including a porous oxide including $TiO_2$ at least and $ZrO_2$ on which Rh is loaded in advance.

$H_2$, which is generated by $Rh/ZrO_2$, inhibits the sulfur poisoning, and the support, which includes $TiO_2$ at least, secures the initial $NO_x$ purifying capability, thereby further inhibiting the sulfur poisoning. Accordingly, it is possible to inhibit the $NO_x$ storage member from the sulfur poisoning, and to maintain a high $NO_x$ conversion even after a durability test.

4 Claims, 2 Drawing Sheets

CATALYST FOR EXHAUST GAS PURIFICATION, PROCESS FOR PRODUCING THE SAME, AND METHOD OF PURIFYING EXHAUST GAS

TECHNICAL FIELD

The present invention relates to a catalyst for purifying an exhaust gas, a process for producing the same, and a method using the catalyst for purifying an exhaust gas, in particular, to an $NO_x$ storage and reduction type catalyst which can efficiently purify nitrogen oxides ($NO_x$) in an exhaust gas which contains oxygen excessively in an amount more than necessary for oxidizing carbon monoxide (CO) and hydrocarbons (HC) which are contained in the exhaust gas, a process for producing the same and a method for purifying the exhaust gas by using the catalyst.

BACKGROUND ART

Conventionally, as a catalyst for purifying an automobile exhaust gas, a 3-way catalyst has been employed which carries out the oxidation of CO and HC and the reduction of $NO_x$ simultaneously to purify an exhaust gas. With regard to such a catalyst, for example, a catalyst has been known widely in which a loading layer comprising γ-alumina is formed on a heat-resistant support, such as cordierite, and a noble metal, such as Pt, Pd and Rh, is loaded on the loading layer.

By the way, the purifying performance of such a catalyst for purifying an exhaust gas depends greatly on the air-fuel ratio (A/F) of an engine. For example, when the air-fuel ratio is large, namely on a lean side where the fuel concentration is lean, the oxygen amount in the exhaust gas increases so that the oxidation reactions of purifying CO and HC are active, on the other hand, the reduction reactions of purifying $NO_x$ are inactive. Conversely, for example, when the air-fuel ratio is small, namely on a rich side where the fuel concentration is high, the oxygen amount in the exhaust gas decreases so that the oxidation reactions are inactive and the reduction reactions are active.

Whilst, in order to suppress the recent global warming, it is required to control the $CO_2$ emission in automobiles. In order to meet the requirement, the lean burn is effective in which the burning is carried out in an oxygen-rich lean atmosphere having a large air-fuel ratio, engines, which are appropriate for the lean burn, have been made practicable. However, when purifying the exhaust gas emitted from the lean burn engines, there arises a problem in that it is difficult to purify the $NO_x$ as aforementioned.

Hence, an $NO_x$ storage and reduction type catalyst has been proposed in which an alkaline-earth metal and Pt are loaded on a porous support, such as alumina ($Al_2O_3$), (Japanese Unexamined Patent Publication (KOKAI) No. 5-317,652, etc.). In accordance with this catalyst, since the $NO_x$ are absorbed in the alkaline earth metal, serving as the $NO_x$ storage member, and since they are reacted with the reducing components, such as HC, and are purified, it is possible to control the emission of the $NO_x$ even on the lean side.

In the catalyst disclosed in Japanese Unexamined Patent Publication (KOKAI) No. 5-317,652, it is believed that barium, for example, is loaded as the carbonate, and the like, on the support, and it reacts with $NO_x$ to generate barium nitrate ($Ba(NO_3)_2$) in a lean atmosphere, thereby storing the $NO_x$. And, when the exhaust gas is in the range of from the stoichiometric point to the rich atmosphere, the stored $NO_x$ are released and are reacted with the reducing components, such as HC and CO, and are thereby reduced. And, in order to enhance the $NO_x$ conversion by carrying out these reactions of the $NO_x$ storage member efficiently, an engine control method has been developed, in which the air-fuel ratio is usually controlled on an oxygen-excessive lean side and it is intermittently controlled in the range of from the stoichiometric point to the rich atmosphere in a pulsating manner, and has been put into practical applications.

In accordance with this engine control method, since the used amount of the fuel is less on the lean side, the emission of the $CO_2$ is suppressed, and the $NO_x$ are stored in the $NO_x$ storage member. Accordingly, the emission of the $NO_x$ is suppressed on the lean side as well. And, the stored $NO_x$ are released in the range of from the stoichiometric point to the rich side, and are reacted with the reducing components, such as HC and CO, by the catalytic action of Pt, and so on. Therefore, a high $NO_x$ purifying capability is exhibited as a whole.

However, in the exhaust gas, $SO_2$ is contained which is generated by burning sulfur (S) contained in the fuel, it is further oxidized to $SO_3$, by the noble metal in an oxygen-rich atmosphere. Then, they are easily reacted with the barium, etc., to generate sulfites and sulfates, and it is understood that the $NO_x$ storage member is thus poisoned and degraded. This phenomenon is referred to as sulfur poisoning. Moreover, the porous support, such as alumina, has a property that it is likely to adsorb the $SO_x$, and there is a problem in that the aforementioned sulfur poisoning is facilitated.

And, when the $NO_x$ storage member is turned into the sulfites and the sulfates, it cannot store the $NO_x$ any more, and, as a result, there is a drawback in the aforementioned $NO_x$ storage and reduction type catalyst in that the $NO_x$ purifying ability decreases after a durability test.

Moreover, since $TiO_2$, which is an acidic oxide, does not adsorb $SO_2$, it was thought of using a $TiO_2$ support, and an experiment was carried out. As a result, $SO_2$ was not adsorbed by the $TiO_2$ and flowed downstream as it was, since only the $SO_2$ which contacted directly with the noble metal, was oxidized, it was revealed that the sulfur poisoning occurred to a lesser extent. However, in the $TiO_2$ support, a drawback was revealed that the initial activity was low. This reason is believed that the $NO_x$ purifying capability of the $NO_x$ storage member decreases because $TiO_2$ reacts with the $NO_x$ storage member to form composite oxides ($BaTiO_3$, etc.) in the temperature range of the exhaust gas.

Hence, in Japanese Unexamined Patent Publication (KOKAI) No. 6-327,945, it is proposed to use a support in which $Al_2O_3$ is mixed with a composite oxide, such as a Ba—Ce composite oxide and a Ba—Ce—Nb composite oxide. In addition, in Japanese Unexamined Patent Publication (KOKAI) No. 8-99,034, it is proposed to use at least one composite support selected from the group consisting of $TiO_2$—$Al_2O_3$, $ZrO_2$—$Al_2O_3$ and $SiO_2$—$Al_2O_3$.

By thus using the support in which the composite oxide is mixed, or by using the composite support, the $NO_x$ storage member is inhibited from the sulfur poisoning, and the $NO_x$ purifying capability after durability is improved.

However, a further reduction of the $CO_2$ emission is required against the recent issue of the global warming, and the lean burn driving range tends to increase. Accordingly, since the sulfur poisoning tends to further increase, and since the exhaust gas emission control tends to be further strengthened, the exhaust gas purifying catalysts are required to furthermore improve their durability.

The present invention has been developed in view of the aforementioned circumstances, and it is an object of the present invention to make an exhaust gas purifying catalyst, in which the sulfur poisoning of the $NO_x$ storage member can be further inhibited, and which can maintain a high $NO_x$ conversion even after a durability test.

DISCLOSURE OF INVENTION

A characteristic of an exhaust gas purifying catalyst according to the present invention, solving the aforementioned assignments, is that the catalyst comprises: a support including a porous oxide including $TiO_2$ at least and $ZrO_2$ on which Rh is loaded in advance; an $NO_x$ storage member including at least one member selected-from the group consisting of alkali metals, alkaline-earth metals and rare-earth elements and loaded on the support; and a noble metal including at least one member selected from the group consisting of Pt, Pd and Rh and loaded on the support.

In the aforementioned exhaust gas purifying catalyst, it is preferred that the porous oxide includes a composite oxide of $Al_2O_3$ and $TiO_2$.

Further, a characteristic of a process for producing an exhaust gas purifying catalyst according to the present invention is that the process comprises the steps of: a step of forming a loading layer on a substrate by using a slurry which includes a porous oxide including $TiO_2$ at least and $ZrO_2$ with Rh loaded in advance; and a step of loading a noble metal including at least one member selected from the group consisting of Pt, Pd and Rh an $NO_x$ storage member including at least one member selected from the group consisting of alkali metals, alkaline-earth metals and rare-earth elements.

Furthermore, a characteristic of an exhaust gas purifying method according to the present invention is that, by using an exhaust gas purifying catalyst, which comprises a support including a porous oxide including $TiO_2$ at least and $ZrO_2$ on which Rh is loaded in advance; an $NO_x$ storage member including at least one member selected from the group consisting of alkali metals, alkaline-earth metals and rare-earth elements and loaded on the support; and a noble metal including at least one member selected from the group consisting of Pt, Pd and Rh and loaded on the support, $NO_x$ are stored in a lean exhaust gas, which is generated by burning an air-fuel mixture of an oxygen excess lean atmosphere; and the stored $NO_x$ are released and reduced in a rich exhaust gas, which is generated by burning an air-fuel mixture of from a stoichiometric point to a fuel rich atmosphere.

In the exhaust gas purifying catalyst according to the present invention, a support is constituted by a porous oxide including $TiO_2$ at least and $ZrO_2$ with Rh loaded in advance (hereinafter referred to as $Rh/ZrO_2$), and an $NO_x$ storage member and a noble metal are loaded on the support. This $Rh/ZrO_2$ exhibits a high function of reducing and purifying $NO_x$, which are released from the $NO_x$ storage member in an exhaust gas atmosphere of from a stoichiometric point to rich, and the $NO_x$ purifying performance is improved sharply. Further, compared with Pt, Rh grows granularly less remarkably in a lean atmosphere. Therefore, the durability upgrades by the presence of Rh.

Further, by Rh, hydrogen of a high reducing power is generated from HC and $H_2O$ in the exhaust gas (steam reforming reaction), this hydrogen contributes greatly to the reduction of $NO_x$ and the elimination of $SO_x$ from the sulfites and sulfides of the $NO_x$ storage member. Thus, the $NO_x$ reduction amount is high in a rich atmosphere, and the sulfur poisoning takes place less-remarkably.

Rh is used in a state where it is loaded on $ZrO_2$ at least. Namely, $ZrO_2$ has a function of sharply improving the steam reforming reaction when it is combined with Rh. In $Rh/ZrO_2$ the loading amount of Rh can preferably be in a range of from 0.1 to 10% by weight, and can optimally be in a range of from 0.5 to 2% by weight. When the loading amount of Rh is less than 0.1% by weight, the $NO_x$ reduction capability decreases, when loading it in excess of 10% by weight, the effect saturates and it is unpreferable in terms of costs.

Furthermore, the ratio of $Rh/ZrO_2$ with respect to the porous oxide in the support can preferably be from 5 to 50% by weight in the support. When $Rh/ZrO_2$ is less than 5% by weight, the $NO_x$ reduction capability decreases in a rich atmosphere, and when it exceeds 50% by weight, the porous oxide amount is so less that the purifying performance decreases relatively.

By the way, $ZrO_2$ may have a drawback in that it exhibits a lower heat resistance compared with $Al_2O_3$, which is often used as a support for a noble metal, so that the specific surface area decreases by the heat in the service as an exhaust gas purifying catalyst, and thereby the dispersibility of the loaded Rh may decrease so that the purifying performance decreases.

Hence, as for a support for Rh, it is preferable to use $ZrO_2$ which is stabilized by an alkaline-earth metal or lanthanum. By using the stabilized $ZrO_2$ support, since the heat resistance is improved so sharply that the highly dispersed state of Rh is maintained, a much higher purifying performance can be obtained even after a durability test.

Moreover, in the exhaust gas purifying catalyst according to the present invention, the porous oxide including $TiO_2$ at least is used together with the aforementioned $Rh/ZrO_2$. As for this porous oxide, although $Al_2O_3$, $SiO_2$ zeolite, and so on, can be exemplified, it is preferable to contain $Al_2O_3$ in addition to $TiO_2$. $Al_2O_3$ can coexist with $TiO_2$ as an independent oxide, or can preferably constitute a composite oxide together with $TiO_2$.

$TiO_2$, as aforementioned, may have a disadvantage in that it reacts with the $NO_x$ storage member to form composite oxides ($BaTiO_3$ etc.) so that the $NO_x$ reduction capability decreases sharply. On the other hand, when $TiO_2$ coexists with $Al_2O_3$, or when a composite oxide of $TiO_2$ and $Al_2O_3$ is formed, it has been apparent that they are inhibited from generating the composite oxides of the $NO_x$ storage member and them. Therefore, as the porous oxide, when $Al_2O_3$ is included in addition to $TiO_2$, it is much better in the heat resistance, and can maintain a high $NO_x$ conversion even after a durability test. Moreover, by the existence of $Al_2O_3$, a high $NO_x$ performance can be obtained even initially.

When $TiO_2$ is mixed as a powder, it is preferred that the particle diameter can fall in a range of from 10 to 1,000 Å. When the particle diameter is less than 10 Å, the particles of $BaTiO_3$, and so on, are coarsened, because the particles as a whole react with the $NO_x$ storage member. Moreover, when the particle diameter exceeds 1,000 Å, the effect of $TiO_2$ addition is not revealed, because the surface area of $TiO_2$ decreases. Accordingly, when the particle diameter of $TiO_2$ falls outside the aforementioned range, it is unpreferable because the $NO_x$ conversion decreases after a durability test even in either of the cases.

A ratio of $Al_2O_3$ to $TiO_2$ can preferably fall in a range of $Al_2O_3/TiO_2$=30/1 to 1/30. When $TiO_2$ is less than the range, it is difficult to inhibit the sulfur poisoning, and when $TiO_2$ exceeds this range, a sufficient purifying performance cannot be obtained.

Note that the support can further include a porous oxide of good gas adsorbing property, such as $SiO_2$ $ZrO_2$ $SiO_2$—$Al_2O_3$, and so on, in addition to $Al_2O_3$ and $TiO_2$.

As for the NO$_x$ storage member, it is at least one member selected from the group consisting of alkali metals, alkaline-earth metals and rare-earth elements, as for the alkali metals, it is possible to list lithium, sodium, potassium, rubidium, cesium and francium. Further, the alkaline-earth metals are referred to as the elements of group IIa in the periodic table of the elements, it is possible to list barium, beryllium, magnesium, calcium and strontium. As for the rare-earth elements, it is possible to list scandium, yttrium, lanthanum, cerium, praseodymium, neodymium, and so on.

The loading amount of the NO$_x$ storage member can preferably be from 0.01 to 10 mole with respect to 100 g of the support. When the loading amount of the NO$_x$ storage member is less than 0.01 mole, a sufficient NO$_x$ purifying performance cannot be obtained, when the loading amount of the NO$_x$ storage member exceeds 10 mole, the NO$_x$ storage member covers the surface of the noble metal so that the purifying performance decreases. Moreover, when the loading amount of the NO$_x$ storage member exceeds 10 mole, there arises such a drawback that the granular growth of the noble metal is facilitated.

As for the noble metal, at least one member, which is selected from the group consisting of Pt, Pd and Rh, is used. The loading amount of the noble metal can preferably be from 0.05 to 5% by weight with respect to the support. When the loading amount of the noble metal is less than 0.05% by weight with respect to the support, the NO$_x$ purifying performance is low, when it is loaded in excess of 5% by weight, the effect saturates and it is unpreferable in terms of costs.

Note that the coexistence form of the porous oxide including TiO$_2$ at least and Rh/ZrO$_2$ can be constituted by mixing the respective powders uniformly, or a coating layer can be constituted by dividing the coating layer into an upper layer and a lower layer, respectively.

And, in the exhaust gas purifying method according to the present invention, by using the aforementioned exhaust gas purifying catalyst, NO$_x$ in a lean exhaust gas, which is generated by burning an air-fuel mixture of an oxygen excess lean atmosphere, is stored in the NO$_x$ storage member, and, in a rich exhaust gas, which is generated by burning an air-fuel mixture of from a stoichiometric point to a rich atmosphere, the NO$_x$ stored in the NO$_x$ storage member are released. And, the released NO$_x$ are reduced and purified by H$_2$ which is generated by HC and CO in the exhaust gas and the steam reforming reaction of Rh in Rh/ZrO$_2$.

Moreover, the sulfur oxides in the exhaust gas reacts with the NO$_x$ storage member to produce the sulfates or sulfides, the sulfates or sulfides are readily decomposed by H$_2$, which is generated by the steam reforming reaction of Rh in Rh/ZrO$_2$ the NO$_x$ storage capability of the NO$_x$ storage member recovers quickly, and accordingly the NO$_x$ storage capability is furthermore improved over the entire atmosphere of the exhaust gas from the lean atmosphere to the rich atmosphere.

Note that the exhaust gas atmosphere is adjusted so that the time, in which the atmosphere is a lean atmosphere, is dozens of times that of the time, in which the atmosphere is from a stoichiometric point to the rich atmosphere, and it is preferred that the atmosphere is varied from a stoichiometric point to a rich atmosphere in a pulsating manner. When the time, in which the atmosphere is from a stoichiometric point to the rich atmosphere, is shorter than the time, it is difficult to reduce and purify NO$_x$ when the time, in which the atmosphere is from a stoichiometric point to a rich atmosphere, is longer than the time, it is unpreferred because the fuel consumption enlarges and the CO$_2$ emission increases.

BEST MODE FOR CARRYING OUT THE INVENTION

EXAMPLES

Hereinafter, the present invention will be described with reference to examples and comparative examples. Note that, unless otherwise specified, "parts" hereinafter mean parts by weight.

Example No. 1

Figure 1:
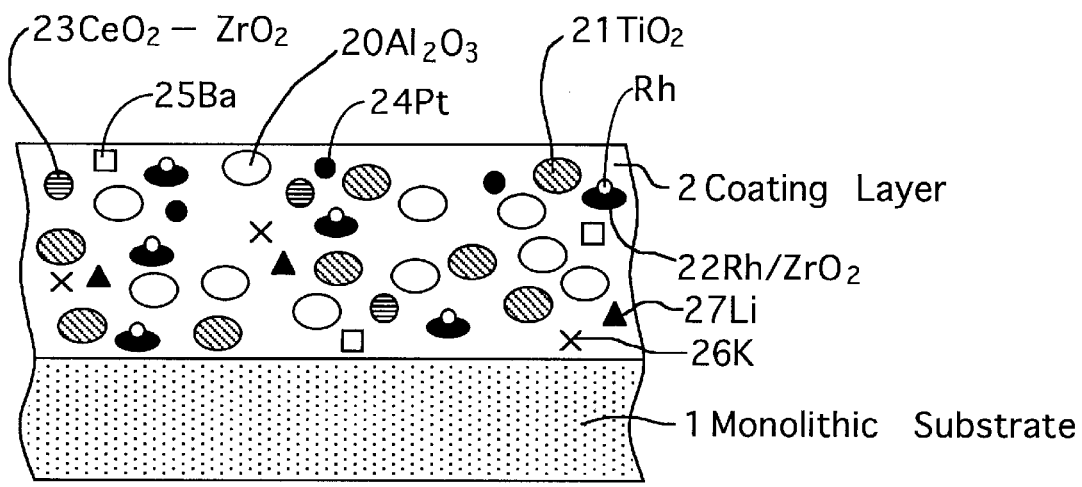
FIG. 1 is a major enlarged cross-sectional diagram for schematically illustrating an exhaust gas purifying catalyst of an embodiment according to the present invention.

FIG. 1 illustrates a schematic cross-sectional view of an exhaust gas purifying catalyst of this embodiment. This exhaust gas purifying catalyst is constituted by a honeycomb-shaped monolithic substrate 1, and a coating layer 2 formed on the surface of the monolithic substrate 1. The coating layer 2 is constituted mainly by an Al$_2$O$_3$ powder 20 and a TiO$_2$ powder 21, and an Rh/ZrO$_2$ powder 22, which is made by loading Rh on the ZrO$_2$ powder, a CeO$_2$—ZrO$_2$ composite oxide powder 23, Pt 24, Ba 25, K 26 and Li 27 are loaded.

Hereinafter, a production process of this catalyst will be described instead of the detailed description of the arrangements.

A rhodium nitrate aqueous solution having a predetermined concentration was impregnated into a ZrO$_2$ powder in a predetermined amount, was dried and burned so that an Rh/ZrO$_2$ powder was prepared. On the Rh/ZrO$_2$ powder, 0.42% by weight of Rh is loaded.

The resulting Rh/ZrO$_2$ powder was mixed with a γ-Al$_2$O$_3$ powder, a rutile type TiO$_2$ powder and a CeO$_2$—ZrO$_2$ composite oxide powder so that a support powder was prepared. The mixing ratio was, by weight ratio, Al$_2$O$_3$:TiO$_2$:Rh/ZrO$_2$:CeO$_2$—ZrO$_2$=1:1:0.1:0.2.

After this support powder was mixed well, it was mixed with water and a trace amount of an alumina sol so that a slurry was prepared, was coated on a surface of a cordierite monolithic support having a volume of 1.3 liter, and was dried at 250° C. for 15 minutes so that a coating layer was formed. The coating layer was formed in an amount of 270 g with respect to 1 liter of the monolithic substrate.

A barium acetate aqueous solution having a predetermined concentration was impregnated into the monolithic catalyst having the coating layer, was dried at 250° C. for 15 minutes, and was thereafter burned at 500° C. for 30 minutes so that Ba was loaded. The loading amount of Ba was 0.2 mole with respect to 1 liter of the monolithic substrate. This was immersed into an aqueous ammonium bicarbonate having a concentration of 15 g/L for 15 minutes, and was dried at 250° C. for 15 minutes so that barium carbonate was made.

Then, a dinitrodiamine platinum nitrate aqueous solution having a predetermined concentration was prepared, the aforementioned monolithic support with Ba loaded was immersed thereinto, was taken up therefrom, was blown off excessive liquid droplets, was dried at 300° C. for 15 minutes, and was burned at 500° C. for 30 minutes so that Pt was loaded. The loading amount of Pt was 2 g with respect to 1 liter of the monolithic substrate.

Moreover, an aqueous solution containing potassium nitrate and lithium nitrate in predetermined concentrations was impregnated into the coating layer in a predetermined amount, was dried at 250° C. for 15 minutes, and was thereafter burned at 500° C. for 30 minutes so that K and Li were loaded, and a catalyst of Example No. 1 was prepared. The loading amounts of K and Li were 0.1 mole, respectively, with respect to 1 liter of monolithic substrate.

Figure 2:
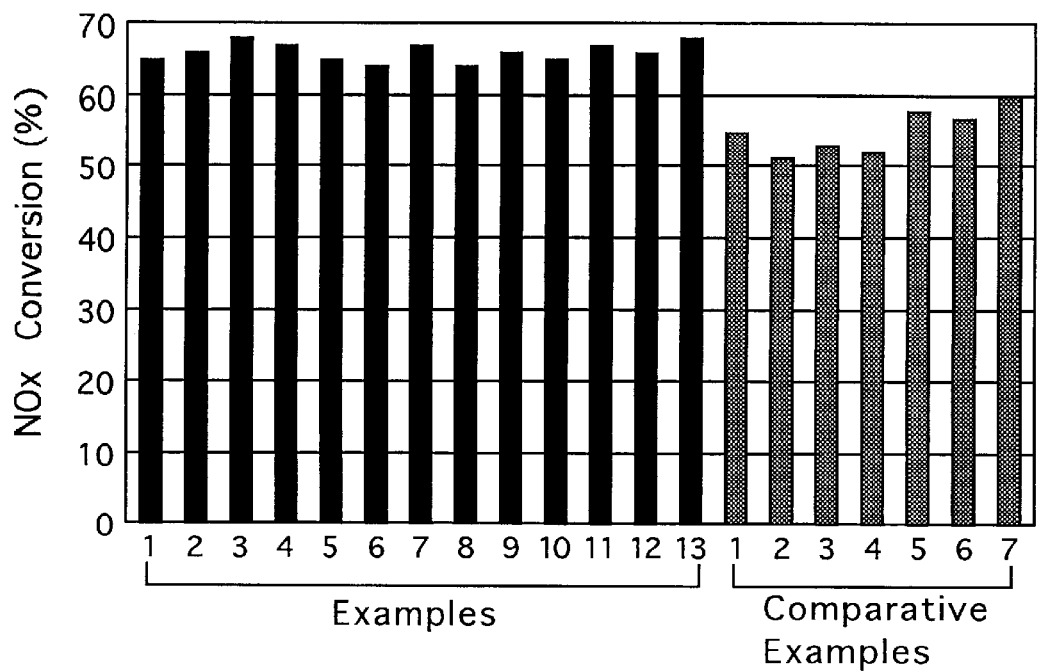
FIG. 2 is a graph for showing after-durability-test NO$_x$ conversions which were exhibited by examples of the present invention and comparative examples.

The resulting catalyst was installed to an exhaust system of a 1.8 L lean burn engine, and a facilitated durability test, in which an automobile was driven in a pattern simulating an urban driving, by using a gasoline containing 200 ppm of sulfur components for 50 hours. Thereafter, while supplying a lean air-fuel mixture whose A/F=18 or more, an air-fuel mixture of from a stoichiometric point to a rich atmosphere whose A/F=14.6 or less was supplied every dozens of seconds in a pulsating manner, the automobile was run in the 10–15 mode, and the $NO_x$ conversions in the driving were measured. The results are illustrated in FIG. 2.

Example No. 2

Except that the mixing ratio was varied to $Al_2O_3$:$TiO_2$:Rh/$ZrO_2$:$CeO_2$—$ZrO_2$=1:1:0.2:0.2 by weight ratio, a support was prepared in the same manner as Example No. 1, the respective components were loaded in the same manner so that a catalyst of Example No. 2 was prepared. And, in the same manner as Example No. 1, $NO_x$ conversions after the durability test were measured. The results are illustrated in FIG. 2.

Example No. 3

Except that the mixing ratio was varied to $Al_2O_3$:$TiO_2$:Rh/$ZrO_2$:$CeO_2$—$ZrO_2$=1:1:0.5:0.2 by weight ratio, a support was prepared in the same manner as Example No. 1, the respective components were loaded in the same manner so that a catalyst of Example No. 3 was prepared. And, in the same manner as Example No. 1, $NO_x$ conversions after the durability test were measured. The results are illustrated in FIG. 2.

Example No. 4

Except that the mixing ratio was varied to $Al_2O_3$:$TiO_2$:Rh/$ZrO_2$:$CeO_2$—$ZrO_2$=1:1:1:0.2 by weight ratio, a support was prepared in the same manner as Example No. 1, the respective components were loaded in the same manner so that a catalyst of Example No. 4 was prepared. And, in the same manner as Example No. 1, $NO_x$ conversions after the durability test were measured. The results are illustrated in FIG. 2.

Example No. 5

Except that the mixing ratio was varied to $Al_2O_3$:$TiO_2$:Rh/$ZrO_2$:$CeO_2$—$ZrO_2$=1:1:2:0.2 by weight ratio, a support was prepared in the same manner as Example No. 1, the respective components were loaded in the same manner so that a catalyst of Example No. 5 was prepared. And, in the same manner as Example No. 1, $NO_x$ conversions after the durability test were measured. The results are illustrated in FIG. 2.

Example No. 6

Except that the mixing ratio was varied to $Al_2O_3$:$TiO_2$:Rh/$ZrO_2$:$CeO_2$—$ZrO_2$=1:1:4:0.2 by weight ratio, a support was prepared in the same manner as Example No. 1, the respective components were loaded in the same manner so that a catalyst of Example No. 6 was prepared. And, in the same manner as Example No. 1, $NO_x$ conversions after the durability test were measured. The results are illustrated in FIG. 2.

Example No. 7

Except that an Rh/$ZrO_2$ powder whose Rh concentration was 0.21% by weight was used, a support was prepared in the same manner as Example No. 1, the respective components were loaded in the same manner so that a catalyst of Example No. 7 was prepared. And, in the same manner as Example No. 1, $NO_x$ conversions after the durability test were measured. The results are illustrated in FIG. 2.

Example No. 8

Except that an Rh/$ZrO_2$ powder whose Rh concentration was 0.08% by weight was, a support was prepared in the same manner as Example No. 1, the respective components were loaded in the same manner so that a catalyst of Example No. 8 was prepared. And, in the same manner as Example No. 1, $NO_x$ conversions after the durability test were measured. The results are illustrated in FIG. 2.

Example No. 9

Except that an Rh/$ZrO_2$ powder whose Rh concentration was 1.25% by weight was used, a support was prepared in the same manner as Example No. 1, the respective components were loaded in the same manner so that a catalyst of Example No. 9 was prepared. And, in the same manner as Example No. 1, $NO_x$ conversions after the durability test were measured. The results are illustrated in FIG. 2.

Example No. 10

Except that the $Al_2O_3$ powder and the $TiO_2$ powder were mixed in 10:1 by weight ratio, and that the mixing ratio was varied to the mixed powder: Rh/$ZrO_2$:$CeO_2$—$ZrO_2$=2:0.5:0.2 by weight ratio, a support was prepared in the same manner as Example No. 1, the respective components were loaded in the same manner so that a catalyst of Example No. 10 was prepared. And, in the same manner as Example No. 1, $NO_x$ conversions after the durability test were measured. The results are illustrated in FIG. 2.

Example No. 11

Except that the $Al_2O_3$ powder and the TiO2 powder were mixed in 4:1 by weight ratio, and that the mixing ratio was varied to the mixed powder: Rh/$ZrO_2$:$CeO_2$—$ZrO_2$=2:0.5:0.2 by weight ratio, a support was prepared in the same manner as Example No. 1, the respective components were loaded in the same manner so that a catalyst of Example No. 11 was prepared. And, in the same manner as Example No. 1, $NO_x$ conversions after the durability test were measured. The results are illustrated in FIG. 2.

Example No. 12

Except that the $Al_2O_3$ powder and the $TiO_2$ powder were mixed in 1:4 by weight ratio, and that the mixing ratio was varied to the mixed powder: Rh/$ZrO_2$:$CeO_2$—$ZrO_2$=2:0.5:0.2 by weight ratio, a support was prepared in the same manner as Example No. 1, the respective components were loaded in the same manner so that a catalyst of Example No. 12 was prepared. And, in the same manner as Example No. 1, $NO_x$ conversions after the durability test were measured. The results are illustrated in FIG. 2.

Example No. 13

Except that a powder ($Rh/ZrO_2$—Ca), in which $ZrO_2$ included Ca in an amount of 4 mole % and Rh was loaded on $ZrO_2$ in an amount of 0.42% by weight, was used instead of the $Rh/ZrO_2$ powder, a support was prepared in the same manner as Example No. 3, and the respective components were loaded in the same manner so that a catalyst of Example No. 13 was prepared. And, in the same manner as Example No. 1, $NO_x$ conversions after the durability test were measured. The results are illustrated in FIG. 2.

Comparative Example No. 1

Except that the $Rh/ZrO_2$ powder was not used, a support was prepared in the same manner as Example No. 1, and the respective components were loaded in the same manner so that a catalyst of Comparative Example No. 1 was prepared. And, in the same manner as Example No. 1, $NO_x$ conversions after the durability test were measured. The results are illustrated in FIG. 2.

Comparative Example No. 2

Except that the $Rh/ZrO_2$ powder was not used, and that the $Al_2O_3$ powder and the $TiO_2$ powder were mixed in a ratio of 10:1 by weight, a support was prepared in the same manner as Example No. 1, and the respective components were loaded in the same manner so that a catalyst of Comparative Example No. 2 was prepared. And, in the same manner as Example No. 1, $NO_x$ conversions after the durability test were measured. The results are illustrated in FIG. 2.

Comparative Example No. 3

Except that the $Rh/ZrO_2$ powder was not used, and that the $Al_2O_3$ powder and the $TiO_2$ powder were mixed in a ratio of 4:1 by weight, a support was prepared in the same manner as Example No. 1, and the respective components were loaded in the same manner so that a catalyst of Comparative Example No. 3 was prepared. And, in the same manner as Example No. 1, $NO_x$ conversions after the durability test were measured. The results are illustrated in FIG. 2.

Comparative Example No. 4

Except that the $Rh/ZrO_2$ powder was not used, and that the $Al_2O_3$ powder and the $TiO_2$ powder were mixed in a ratio of 1:4 by weight, a support was prepared in the same manner as Example No. 1, and the respective components were loaded in the same manner so that a catalyst of Comparative Example No. 4 was prepared. And, in the same manner as Example No. 1, $NO_x$ conversions after the durability test were measured. The results are illustrated in FIG. 2.

Comparative Example No. 5

Except that the $Rh/ZrO_2$ powder was not used, a support was prepared in the same manner as Example No. 1, the respective components were thereafter loaded in the same manner, and further a rhodium nitrate aqueous solution having a predetermined concentration was used, and Rh was loaded in an amount equal to the amount contained in the $Rh/ZrO_2$ powder on the support of Example No. 1 so that a catalyst of Comparative Example No. 5 was prepared. And, in the same manner as Example No. 1, $NO_x$ conversions after the durability test were measured. The results are illustrated in FIG. 2. Namely, this catalyst was free from $ZrO_2$.

Comparative Example No. 6

Except that a $ZrO_2$ powder was used instead of the $Rh/ZrO_2$ powder, a support was prepared in the same manner as Example No. 1, and the respective components were loaded in the same manner so that a catalyst of Comparative Example No. 6 was prepared. And, in the same manner as Example No. 1, $NO_x$ conversions after the durability test were measured. The results are illustrated in FIG. 2. Namely, this catalyst was free from Rh.

Comparative Example No. 7

Except that a $ZrO_2$ powder was used instead of the $Rh/ZrO_2$ powder, a support was prepared in the same manner as Example No. 1, the respective components were thereafter loaded in the same manner, and further a rhodium nitrate aqueous solution having a predetermined concentration was used, and Rh was loaded in an amount equal to the amount contained in the $Rh/ZrO_2$ powder on the support of Example No. 1 so that a catalyst of Comparative Example No. 7 was prepared. And, in the same manner as Example No. 1, $NO_x$ conversions after the durability test were measured. The results are illustrated in FIG. 2. Namely, in this catalyst, Rh was not necessarily loaded on $ZrO_2$.

Evaluation

In Table 1, there is summarized and shown the support arrangements of the catalysts of the aforementioned examples and comparative examples.

TABLE 1

| | *1 | Support Composition Ratio (Weight) | | | | | | *2 |
|---|---|---|---|---|---|---|---|---|
| | $Al_2O_3/TiO_2$ | $Al_2O_3 + TiO_2$ | $Rh/ZrO_2$ | $CeO_2$—$ZrO_2$ | $Rh/(ZrO_2 + Ca)$ | Rh | $ZrO_2$ | (% by weight) |
| Ex. 1 | 1/1 | 2 | 0.1 | 0.2 | — | — | — | 0.42 |
| Ex. 2 | 1/1 | 2 | 0.2 | 0.2 | — | — | — | 0.42 |
| Ex. 3 | 1/1 | 2 | 0.5 | 0.2 | — | — | — | 0.42 |
| Ex. 4 | 1/1 | 2 | 1 | 0.2 | — | — | — | 0.42 |
| Ex. 5 | 1/1 | 2 | 2 | 0.2 | — | — | — | 0.42 |
| Ex. 6 | 1/1 | 2 | 4 | 0.2 | — | — | — | 0.42 |
| Ex. 7 | 1/1 | 2 | 0.1 | 0.2 | — | — | — | 0.21 |
| Ex. 8 | 1/1 | 2 | 0.1 | 0.2 | — | — | — | 0.08 |

TABLE 1-continued

| | *1 | Support Composition Ratio (Weight) | | | | | | *2 |
|---|---|---|---|---|---|---|---|---|
| | $Al_2O_3/TiO_2$ | $Al_2O_3 + TiO_2$ | $Rh/ZrO_2$ | $CeO_2$—$ZrO_2$ | $Rh/(ZrO_2 + Ca)$ | Rh | $ZrO_2$ | (% by weight) |
| Ex. 9 | 1/1 | 2 | 0.1 | 0.2 | — | — | — | 1.25 |
| Ex. 10 | 10/1 | 2 | 0.5 | 0.2 | — | — | — | 0.42 |
| Ex. 11 | 4/1 | 2 | 0.5 | 0.2 | — | — | — | 0.42 |
| Ex. 12 | 1/4 | 2 | 0.5 | 0.2 | — | — | — | 0.42 |
| Ex. 13 | 1/1 | 2 | — | 0.2 | 0.2 | — | — | 0.42 |
| C.E. 1 | 1/1 | 2 | — | 0.2 | — | — | — | — |
| C.E. 2 | 10/1 | 2 | — | 0.2 | — | — | — | — |
| C.E. 3 | 4/1 | 2 | — | 0.2 | — | — | — | — |
| C.E. 4 | 1/4 | 2 | — | 0.2 | — | — | — | — |
| C.E. 5 | 1/1 | 2 | — | 0.2 | — | 0.42 | — | — |
| C.E. 6 | 1/1 | 2 | — | 0.2 | — | — | 0.1 | — |
| C.E. 7 | 1/1 | 2 | — | 0.2 | — | 0.42 | 0.1 | — |

Notes:
*1 stands for Composition Ratio (Weight).
*2 stands for Rh Content in $Rh/ZrO_2$.

According to FIG. 2, it is understood that the catalysts of the respective examples were superior to the catalysts of comparative examples in terms of the $NO_x$ purifying capability after the durability test, and it is apparent that it was an effect resulting from mixing the $Rh/ZrO_2$ powder with the support composed of $Al_2O_3$ and $TiO_2$. Namely, the present exhaust gas purifying catalyst is extremely good in terms of the durability, and, in accordance with the present exhaust gas purifying catalyst, it is possible to stably reduce and purify the $NO_x$ in the exhaust gas for a long period of time.

And, by comparing Example Nos. 1–6, it is understood that there is an optimum range in terms of the $Rh/ZrO_2$ powder content, and it is understood that it can preferably fall in a range of ¼–½ with respect to the summed amount of $Al_2O_3$ and $TiO_2$. Further, by comparing Example No. 1 and Example Nos. 7–9, it is understood that the Rh concentration in the $Rh/ZrO_2$ powder can preferably be around 0.21% by weight. Furthermore, by comparing Example No. 3 and Example Nos. 10–12, it is understood that the mixing ratio of $Al_2O_3$ and $TiO_2$ can preferably be adjacent to 1:1 by weight ratio.

Whilst, by comparing Comparative Example Nos. 5–7, when Rh coexisted with $ZrO_2$, it is understood that the $NO_x$ purifying capability was improved most. And, by comparing Example No. 1 with Comparative Example No. 7, it is apparent that an exceptionally high $NO_x$ purifying conversion was exhibited when Rh was loaded on $ZrO_2$.

Moreover, by comparing Example No. 2 and Example No. 13, it is also understood that it was more preferable to use $ZrO_2$, which was stabilized by Ca and which was loaded with Rh, than to use simple the $Rh/ZrO_2$.

Example No. 14

A predetermined amount of a rhodium nitrate aqueous solution having an Rh concentration of 3% by weight was charged into a beaker, which held 100 parts by weight of distilled water therein, and 20 parts by weight of a $ZrO_2$ powder having a specific surface area of 90 $m^2$/g was added thereto while stirring, and was mixed for 1 hour. This mixture solution was filtered by vacuum suctioning, was dried at 110° C., and was thereafter calcined at 250° C. for 1 hour to load Rh in an amount of 0.5% by weight to prepare a $Rh/ZrO_2$ powder. Hereinafter, this powder is referred to as a powder "A".

Whilst, an Al chelate (ethyl acetoacetate aluminum di-isopropylate) and a Ti alkoxide (titanium tri-isopropoxide) were dissolved into 2-propanol so that they were $Al_2O_3:TiO_2=2:1$ by molar ratio, were held at 60° C. while stirring, and were hydrolyzed by adding a predetermined amount of water. After the hydrolysis, they were insulated thermally at 60° C., the resulting gel was aged, and it was thereafter dried under decompression while subjecting it to a vibration. After calcining the dried powder at 500° C., it was burned at 800° C. so that an amorphous Al—Ti composite oxide powder was prepared.

Next, by using a dinitrodiammine platinum hydroxide aqueous solution, 2 g of Pt was loaded on and with respect to 160 g of this Al—Ti composite oxide powder. Further, by using a mixture aqueous solution of barium acetate and potassium acetate, 0.2 mole of Ba and 0.1 mole of K were loaded on and with respect to 160 g of the Al—Ti composite oxide powder. Hereinafter, this powder is referred to as a powder "B".

50 parts by weight of the powder "A" and 150 parts by weight of the powder "B" were weighed, were charged into a ball mill, and were mixed for 48 hours. This mixture powder was formed by hydrostatic pressure at a forming pressure of 49 MPa, this formed substance was pulverized in a mortar, and was thereafter made to the same particle diameter by a sieve so that pelletized catalysts of from 0.5–1.7 mm approximately in size were prepared. This pelletized catalyst was disposed in an evaluation apparatus, and a model gas of lean 1 set forth in Table 2 was flowed at a space velocity of 100,000 $hr^{-1}$ at a catalyst-inlet gas temperature of 350° C. so that an initial $NO_x$ conversion was measured. The $NO_x$ conversion was calculated from an $NO_x$ concentration at the inlet of the catalyst and an $NO_x$ concentration at the outlet of the catalyst.

TABLE 2

|  | $O_2$ (%) | $CO_2$ (%) | $H_2O$ (%) | O ppm) | NO (ppm) | $C_3H_6$ (ppm C) | $SO_2$ ppm) | $H_2$ (%) | $N_2$ |
|---|---|---|---|---|---|---|---|---|---|
| Lean 1 | 5 | 10 | 10 | 00 | 400 | 1000 | — | — | Balance |
| Lean 2 | 5 | 10 | 10 | 00 | 400 | 1000 | 100 | — | Balance |
| Rich | — | 10 | 10 | % | 200 | 2000 | — | 2 | Balance |

Further, this pelletized catalyst was disposed in an evaluation apparatus, and a durability test was carried out by alternately flowing a model gas of lean 2 set forth in Table 2 and a rich model gas while switching the gases (a model gas of lean 2 was flowed for 1 minute, and a rich model gas was flowed for 5 seconds) at a catalyst inlet temperature of 600° C. for 5 hours. Then, the model gas of lean 1 set forth in Table 1 was flowed at a space velocity of 100,000 hr$^{-1}$ at a catalyst inlet gas temperature of 350° C. so that an NO$_x$ conversion after durability was measured.

Figure 3:
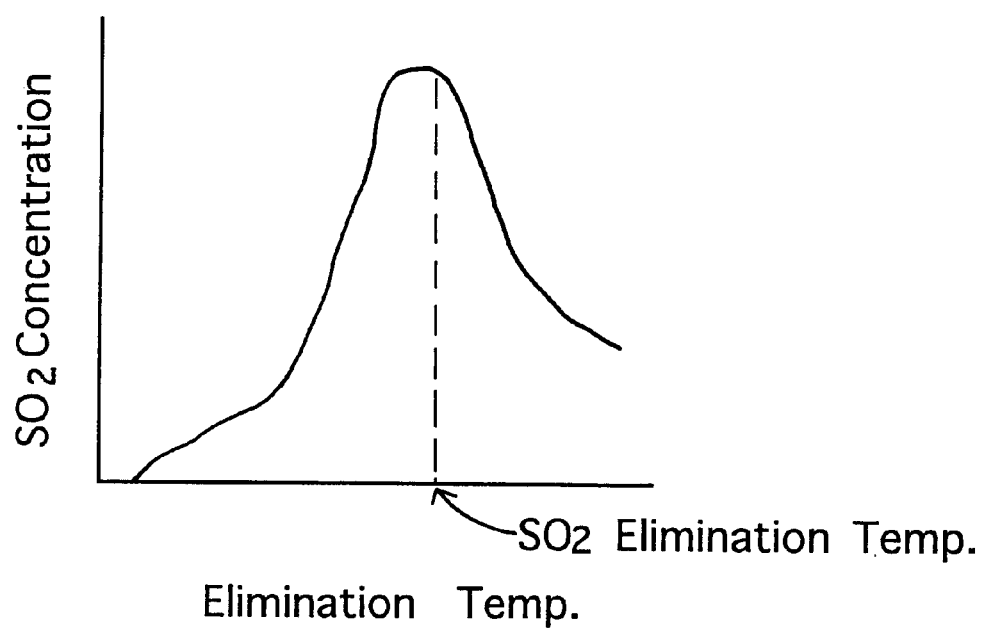
FIG. 3 is a graph for showing an SO$_2$ emission behavior.

Furthermore, the temperature of the pelletized catalysts after the durability test was increased from room temperature by a temperature increment rate of 10° C./minute in the aforementioned rich model gas, and the SO$_2$ elimination behavior was examined by using a mass spectrometer. And, the SO$_2$ elimination temperature, at which the elimination behavior curve exhibits a peak value, for example, as illustrated in FIG. 3, was measured. The SO$_2$ elimination temperature was thus measured. These results are set forth in Table 3.

Example No. 15

Except that the Rh loading amount of the powder "A" was varied to 0.1% by weight, a pelletized catalyst was prepared in the same manner as Example No. 14, and was similarly measured for the initial and after durability NO$_x$ conversions and the SO$_2$ elimination temperature. These results are set forth in Table 3.

Example No. 16

Except that the Rh loading amount of the powder "A" was varied to 2% by weight, a pelletized catalyst was prepared in the same manner as Example No. 14, and was similarly measured for the initial and after durability NO$_x$ conversions and the SO$_2$ elimination temperature. These results are set forth in Table 3.

Example No. 17

Except that the Rh loading amount of the powder "A" was varied to 4% by weight, a pelletized catalyst was prepared in the same manner as Example No. 14, and was similarly measured for the initial and after durability NO$_x$ conversions and the SO$_2$ elimination temperature. These results are set forth in Table 3.

Example No. 18

Except that the Ba loading amount of the powder "B" was varied to 0.1 mole, a pelletized catalyst was prepared in the same manner as Example No. 14, and was similarly measured for the initial and after durability NO$_x$ conversions and the SO$_2$ elimination temperature. These results are set forth in Table 3.

Example No. 19

Except that Mg was loaded instead of Ba in an amount of 0.2 mole in the powder "B", a pelletized catalyst was prepared in the same manner as Example No. 14, and was similarly measured for the initial and after durability NO$_x$ conversions and the SO$_2$ elimination temperature. These results are set forth in Table 3.

Example No. 20

Except that Li was loaded instead of Ba in an amount of 0.1 mole in the powder "B" and K was loaded in an amount of 0.2 mole therein, a pelletized catalyst was prepared in the same manner as Example No. 14, and was similarly measured for the initial and after durability NO$_x$ conversions and the SO$_2$ elimination temperature. These results are set forth in Table 3.

Example No. 21

Except that the composition ratio of the Al$_2$O$_3$ powder and the TiO$_2$ powder was varied to a ratio of 6:1 by molar ratio in the powder "B", a pelletized catalyst was prepared in the same manner as Example No. 14, and was similarly measured for the initial and after durability NO$_x$ conversions and the SO$_2$ elimination temperature. These results are set forth in Table 3.

Example No. 22

Except that the mixing ratio of the powder "A" and the powder "B" was varied to the powder "A"/the powder "B"=90/110 by weight ratio, a pelletized catalyst was prepared in the same manner as Example No. 14, and was similarly measured for the initial and after durability NO$_x$ conversions and the SO$_2$ elimination temperature. These results are set forth in Table 3.

Example No. 23

An amorphous Al—Ti composite oxide was prepared in the same manner as Example No. 14. Next, by using a dinitrodiammine platinum hydroxide aqueous solution, 2 g of Pt was loaded on and with respect to 160 g of this Al—Ti composite oxide powder.

150 parts by weight of the resulting powder, 50 parts by weight of the powder "A", 6 parts by weight of aluminum hydroxide serving as a binder, 30 parts by weight of aluminum nitrate serving as a pH conditioner, and 200 parts by weight of water were mixed so that a slurry was prepared.

Next, a honeycomb-shaped monolithic substrate was prepared, the aforementioned slurry was coated thereon, was dried, and was burned to prepare a coating layer thereon. The coating amount of the coating layer was 240 g with respect to 1 liter of the monolithic substrate. Next, by using a barium acetate aqueous solution, Ba was loaded in the coating layer in an amount of 0.2 mole with respect to 1 liter of the monolithic substrate. And, it was immersed into an ammonium bicarbonate so that Ba was turned into BaCO$_3$. Further, by using a dinitrodiammine platinum hydroxide aqueous solution, 1 g of Pt was loaded in the surface portion of the coating layer with respect to 1 liter of the monolithic substrate, finally, by using a potassium acetate aqueous solution, K was loaded in the coating layer in an amount of 0.1 mol with respect to 1 liter of the substrate.

The resulting monolithic catalyst was processed to a diameter of 3 cm and a length of 5 cm in order to make a test piece. Then, this test piece was disposed in an evaluation apparatus, and, in the same manner as Example No. 1, it was similarly measured for the initial and after durability $NO_x$ conversions and the $SO_2$ elimination temperature. These results are set forth in Table 3.

Example No. 24

Except that an $Al_2O_3$ powder and a $TiO_2$ powder were mixed so as to be $Al_2O_3$:$TiO_2$=2:1 by molar ratio instead of the Al—Ti composite oxide powder, a pelletized catalyst was prepared in the same manner as Example No. 14, and was similarly measured for the initial and after durability $NO_x$ conversions and the $SO_2$ elimination temperature. These results are set forth in Table 3.

Example No. 25

Except that the loading amount of Rh was varied to 0.01% by weight in the powder "A", a pelletized catalyst was prepared in the same manner as Example No. 14, and was similarly measured for the initial and after durability $NO_x$ conversions and the $SO_2$ elimination temperature. These results are set forth in Table 3.

Example No. 26

Except that the loading amount of Pt was varied to 0.2 g in the powder "B", a pelletized catalyst was prepared in the same manner as Example No. 14, and was similarly measured for the initial and after durability $NO_x$ conversions and the $SO_2$ elimination temperature. These results are set forth in Table 3.

Example No. 27

Except that Ba was loaded in an amount of 0.2 mole in the powder "B", and that the mixing amounts of the powder "A" and the powder "B" were the powder "A"/the powder "B"=150/50, a pelletized catalyst was prepared in the same manner as Example No. 14, and was similarly measured for the initial and after durability $NO_x$ conversions and the $SO_2$ elimination temperature. These results are set forth in Table 3.

Comparative Example No. 8

Except that only the powder "A" was used, a pelletized catalyst was prepared in the same manner as Example No. 14, and was similarly measured for the initial and after durability $NO_x$ conversions and the $SO_2$ elimination temperature. These results are set forth in Table 3.

Comparative Example No. 9

Except that only the powder "A", whose Rh loading amount was 2% by weight, was used, a pelletized catalyst was prepared in the same manner as Example No. 14, and was similarly measured for the initial and after durability $NO_x$ conversions and the $SO_2$ elimination temperature. These results are set forth in Table 3.

Comparative Example No. 10

Except that only the powder "B" was used, a pelletized catalyst was prepared in the same manner as Example No. 14, and was similarly measured for the initial and after durability $NO_x$ conversions and the $SO_2$ elimination temperature. These results are set forth in Table 3.

Comparative Example No. 11

Except that Pt was loaded in an amount of 4 g in the powder "B", a pelletized catalyst was prepared in the same manner as Example No. 14, and was similarly measured for the initial and after durability $NO_x$ conversions and the $SO_2$ elimination temperature. These results are set forth in Table 3.

Evaluation

TABLE 3

| | *1 | *2 | | | | | *3 | | $Al_2O_3$/$TiO_2$ | | | *6 | | | |
|---|---|---|---|---|---|---|---|---|---|---|---|---|---|---|---|
| | Rh (wt %) | Pt | Ba | K | Mg | Li | $TiO_2$ | $Al_2O_3$ | molar ratio | *4 | *5 | *7 | *8 | *9 | *10 |
| Ex. 14 | 0.5 | 2 | 0.2 | 0.1 | — | — | — | — | 2/1 | 50/150 | Pellet | 99 | 72 | 72.7 | 410 |
| Ex. 15 | 0.1 | 2 | 0.2 | 0.1 | — | — | — | — | 2/1 | 50/150 | Pellet | 99 | 55 | 55.5 | 510 |
| Ex. 16 | 2 | 2 | 0.2 | 0.1 | — | — | — | — | 2/1 | 50/150 | Pellet | 95 | 65 | 68.4 | 415 |
| Ex. 17 | 4 | 2 | 0.2 | 0.1 | — | — | — | — | 2/1 | 50/150 | Pellet | 91 | 59 | 64.8 | 410 |
| Ex. 18 | 0.5 | 2 | 0.1 | 0.1 | — | — | — | — | 2/1 | 50/150 | Pellet | 99 | 61 | 61.6 | 445 |
| Ex. 19 | 0.5 | 2 | — | 0.1 | 0.2 | — | — | — | 2/1 | 50/150 | Pellet | 89 | 52 | 58.4 | 430 |
| Ex. 20 | 0.5 | 2 | — | 0.2 | — | 0.1 | — | — | 2/1 | 50/150 | Pellet | 93 | 59 | 63.4 | 425 |
| Ex. 21 | 0.5 | 2 | 0.2 | 0.1 | — | — | — | — | 6/1 | 50/150 | Pellet | 97 | 55 | 56.7 | 475 |
| Ex. 22 | 0.5 | 2 | 0.2 | 0.1 | — | — | — | — | 2/1 | 90/110 | Pellet | 95 | 69 | 72.6 | 410 |
| Ex. 23 | 0.5 | 2 | 0.2 | 0.1 | — | — | — | — | 2/1 | 50/150 | Mono. | 99 | 74 | 74.7 | 405 |
| Ex. 24 | 0.5 | 2 | 0.2 | 0.1 | — | — | 50 | 150 | 2/1 | — | Pellet | 99 | 47 | 47.5 | 510 |
| Ex. 25 | 0.01 | 2 | 0.2 | 0.1 | — | — | — | — | 2/1 | 50/150 | Pellet | 99 | 41 | 41.4 | 500 |
| Ex. 26 | 0.5 | 0.2 | 0.2 | 0.1 | — | — | — | — | 2/1 | 50/150 | Pellet | 35 | 19 | 54.2 | 520 |
| Ex. 27 | 0.5 | 2 | 0.2 | 0.1 | — | — | — | — | 2/1 | 150/50 | Pellet | 79 | 45 | 57.0 | 490 |
| C.E. 8 | 0.5 | — | — | — | — | — | — | — | — | 100/0 | Pellet | 40 | 25 | 62.5 | 515 |

TABLE 3-continued

| | *1 | *2 | | | | | *3 | | $Al_2O_3/TiO_2$ | | | *6 | | | |
|---|---|---|---|---|---|---|---|---|---|---|---|---|---|---|---|
| | Rh (wt %) | Pt | Ba | K | Mg | Li | $TiO_2$ | $Al_2O_3$ | molar ratio | *4 | *5 | *7 | *8 | *9 | *10 |
| C.E. 9 | 2 | — | — | — | — | — | — | — | — | 100/0 | Pellet | 55 | 31 | 56.4 | 480 |
| C.E. 10 | — | 2 | 0.2 | 0.1 | — | — | — | — | 2/1 | 0/100 | Pellet | 81 | 25 | 30.9 | 700 |
| C.E. 11 | — | 4 | 0.2 | 0.1 | — | — | — | — | 2/1 | 0/100 | Pellet | 99 | 39 | 39.4 | 560 |

Notes:
*1 stands for Powder "A", $Rh/ZrO_2$.
*2 stands for Loading Composition of Powder "B" (Al-Ti Composite Oxide) (Pt in g; Others in mole)
*3 stands for Powder Mixing.
*4 stands for Powder "A"/Powder "B".
*5 stands for Catalyst Construction.
*6 stands for $NO_x$ Conversion (%).
*7 stands for Initially.
*8 stands for After Durability Test.
*9 stands for Conversion Retention Rate.
*10 stands for $SO_2$ Elimination Temperature (° C.).

By comparing Comparative Example No. 10 and Comparative Example No. 8 with Example No. 14, it is apparent that the $NO_x$ conversion after durability was improved greatly by coexisting the powder "B" and the powder "A". Note that, like Comparative Example No. 11, the initial $NO_x$ conversion was improved by increasing the Pt loading amount on the powder "B", however, the conversion after durability was not improved so much. Further, like Comparative Example No. 9, when the Rh loading amount on the powder "A" was increased, the initial $NO_x$ conversion was improved slightly, however, the conversion retention rate was decreased adversely. Furthermore, in Comparative Example No. 10, the $SO_2$ elimination temperature was extremely high. Therefore, it is apparent that, by coexisting the powder "A" with the powder "B", $SO_2$ was eliminated at lower temperatures so that the $NO_x$ storage member could be inhibited from the sulfur poisoning.

Namely, it is apparent that, by the coexistence of the Al—Ti composite oxide and the $Rh/ZrO_2$ the durability was improved remarkably.

Note that, when Example Nos. 14–17 were compared with Example No. 25, there was an optimum range in the Rh loading amount in the $Rh/ZrO_2$ powder, and that the optimum range lies in from 0.5 to 2% by weight approximately. Further, by comparing Example No. 14 with Example No. 24, it is apparent that the $NO_x$ conversion after durability was improved remarkably by making $Al_2O_3$ and $TiO_2$ into a composite oxide. Furthermore, when Example No. 14 and Example No. 26 are compared, 0.2 g of Pt loading amount on the powder "B" was insufficient so that the initial $NO_x$ conversion was low, and when Example No. 14 is compared with Example No. 23, it is understood that the honeycomb-shaped monolithic catalyst exhibited a higher performance than the pelletized catalyst.

Industrial Applicability

Namely, by the exhaust gas purifying catalyst according to the present invention, a high $NO_x$ purifying capability is exhibited initially, since it is extremely good in terms of the sulfur poisoning resistance, the $NO_x$ storage member is inhibited from the sulfur poisoning in the durability test, and thereby it is possible to secure a high $NO_x$ conversion even after the durability test.

Moreover, since an apparent density of $ZrO_2$ is higher than that of $Al_2O_3$, which has been used conventionally, it is possible to thin out the thickness of the coating layer. Therefore, by the exhaust gas purifying catalyst according to the present invention, there arises an effect in that it is possible to reduce the pressure loss of the exhaust gas so that the engine output is improved.

And, by the exhaust gas purifying process according to the present invention, it is possible to stably reduce and purify the $NO_x$ in the exhaust gas from the beginning for a long period of time.

What is claimed is:

1. A catalyst for purifying an exhaust gas comprising:
   a substrate and a coating layer on the surface of the substrate, wherein the coating layer comprises
      a porous oxide comprising $TiO_2$, and $ZrO_2$ on which Rh is loaded in advance;
      an $NO_x$ storage member comprising at least one member selected from the group consisting of alkali metals, alkaline-earth metals and rare-earth elements; and
      a noble metal including at least one member selected from the group consisting of Pt, Pd and Rh.

2. The exhaust gas purifying catalyst according to claim 1, wherein said porous oxide includes a composite oxide of alumina and titania.

3. A method for purifying an exhaust gas using the exhaust gas purifying catalyst of claim 1,
   wherein, $NO_x$ is stored in a lean exhaust gas, said lean exhaust gas generated by burning an air-fuel mixture of an oxygen excess lean atmosphere; and the stored $NO_x$ is released and reduced in a rich exhaust gas, said rich exhaust gas generated by burning an air-fuel mixture of from a stoichiometric point to a fuel rich atmosphere.

4. A process for producing an exhaust gas purifying catalyst comprising the steps of:
   forming a coating layer on a substrate by using a slurry that includes a porous oxide comprising $TiO_2$, and $ZrO_2$ with Rh loaded in advance; and
   loading a noble metal including at least one member selected from the group consisting of Pt, Pd and Rh, and an $NO_x$ storage member including at least one member selected from the group consisting of alkali metals, alkaline-earth metals and rare-earth elements.

* * * * *